United States Patent
Durairaj et al.

(10) Patent No.: US 11,593,320 B2
(45) Date of Patent: Feb. 28, 2023

(54) DYNAMICALLY MOVING VIRTUAL MACHINE (VM) DATA BASED UPON CONTEXT

(71) Applicant: Dell Products, L.P., Round Rock, TX (US)

(72) Inventors: Vinod Durairaj, Bangalore (IN); Suren Kumar, Tamil Nadu (IN); Vaideeswaran Ganesan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 338 days.

(21) Appl. No.: 16/928,835

(22) Filed: Jul. 14, 2020

(65) Prior Publication Data

US 2022/0019560 A1  Jan. 20, 2022

(51) Int. Cl.
*G06F 16/188* (2019.01)
*G06F 16/11* (2019.01)
*G06F 16/182* (2019.01)
*G06F 9/455* (2018.01)

(52) U.S. Cl.
CPC ........ *G06F 16/188* (2019.01); *G06F 9/45558* (2013.01); *G06F 16/119* (2019.01); *G06F 16/128* (2019.01); *G06F 16/1824* (2019.01); *G06F 2009/4557* (2013.01); *G06F 2009/45595* (2013.01)

(58) Field of Classification Search
CPC .. G06F 16/188; G06F 16/1824; G06F 16/119; G06F 16/128; G06F 9/45558; G06F 2009/4557; G06F 2009/45595
See application file for complete search history.

(56) References Cited

U.S. PATENT DOCUMENTS

| | | | |
|---|---|---|---|
| 2012/0084262 A1* | 4/2012 | Dwarampudi | G06F 11/1448 711/E12.001 |
| 2015/0373102 A1* | 12/2015 | Antony | G06F 9/45558 709/219 |
| 2016/0042005 A1* | 2/2016 | Liu | G06F 3/0643 711/103 |
| 2018/0349168 A1* | 12/2018 | Ahmed | G06F 9/45558 |
| 2019/0317682 A1* | 10/2019 | Li | G06F 3/0632 |
| 2020/0065195 A1* | 2/2020 | Benboubakeur | G06F 11/1458 |

* cited by examiner

*Primary Examiner* — Jacob D Dascomb
(74) *Attorney, Agent, or Firm* — Fogarty LLP

(57) ABSTRACT

Systems and methods for dynamically moving virtual machine (VM) data based upon context are described. In some embodiments, an Information Handling System (IHS) may include a processor and a memory coupled to the processor, the memory having program instructions stored thereon that, upon execution, cause the IHS to: select a VM having a plurality of VM files; identify, among the plurality of VM files, a movable VM file; and transfer the movable VM file from a first storage tier to a second storage tier based upon a usage classification associated with the movable VM file.

15 Claims, 5 Drawing Sheets

| UNMOVABLE VM FILES | |
|---|---|
| .nvram | THE NVRAM FILE, WHICH STORES THE STATE OF THE VIRTUAL MACHINE BIOS |
| .vmem | THE VIRTUAL MACHINE PAGING FILE, WHICH BACKS UP THE GUEST MAIN MEMORY ON THE HOST FILE SYSTEM. THIS FILE EXISTS ONLY WHEN THE VIRTUAL MACHINE IS RUNNING OR IF THE VIRTUAL MACHINE FAILS |
| -flat.vmdk | VIRTUAL MACHINE DATA DISK |
| .vswp | VIRTUAL MACHINE SWAP FILE |
| .log | CURRENT VIRTUAL MACHINE LOG FILE |

FIG. 5

| DATA/FILE FORMAT | DATA DESCRIPTION | MOVABLE VM FILES | | | |
|---|---|---|---|---|---|
| | | MINIMUM FILE SIZE | HIGH | MEDIUM | LOW |
| .vmsn | THE SNAPSHOT STATE FILE, WHICH STORES THE RUNNING STATE OF A VIRTUAL MACHINE AT THE TIME YOU TAKE THAT SNAPSHOT | 16MB-508GB | STATIC: SNAPSHOT OF N, N-1 VERSION DYNAMIC: CREATED/ USED < ONE WEEK | STATIC: SNAPSHOT OF N, N-1 VERSION DYNAMIC: CREATED/USED < TEN WEEK | STATIC: SNAPSHOT OF N-2 TO N-5 VERSION DYNAMIC: CREATED/USED < FIVE MONTHS |
| .vmss | THE SUSPENDED STATE FILE, WHICH STORES THE STATE OF A SUSPENDED VIRTUAL MACHINE | .vmss FILE IS EQUIVALENT TO THE TOTAL MEMORY ASSIGNED TO THE VIRTUAL MACHINE | STATIC: SUSPENDED STATE OF PRESENTLY USED VM DYNAMIC: NOT BEEN USED > ONE WEEK | STATIC: SUSPENDED STATE WHICH TAKE > ONE WEEK DYNAMIC: NOT BEEN USED > ONE WEEK | STATIC: SUSPENDED STATE WHICH TAKE < ONE MONTH DYNAMIC: NOT BEEN USED < ONE MONTH |
| .vmsd | VIRTUAL MACHINE SNAPSHOTS | 16 MB - TO THEY GROW AS THE SYSTEM MAKES WRITES TO THE VM'S DISK FILES | STATIC: SNAPSHOT OF N, N-1 VERSION DYNAMIC: CREATED/USED < ONE WEEK | STATIC: SNAPSHOT OF N, N-1 VERSION DYNAMIC: CREATED/ USED < TEN WEEK | STATIC: SNAPSHOT OF N-2 TO N-5 VERSION DYNAMIC: CREATED/USED < FIVE MONTHS |

DYNAMICALLY MOVING VIRTUAL MACHINE (VM) DATA BASED UPON CONTEXT

FIELD

This disclosure relates generally to Information Handling Systems (IHSs), and more specifically, to systems and methods for dynamically moving virtual machine (VM) data based upon context.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A virtual machine (VM) is a program executed by an IHS that works as if it were a virtual, separate IHS inside the main IHS. The program that creates and manages these VMs is a virtualization software called a hypervisor, and the IHS that runs the VM is called the host. The hypervisor controls how the VM can access memory, hard drive, and other resources on the host IHS.

SUMMARY

Embodiments of systems and methods for dynamically moving virtual machine (VM) data based upon context are described. In an illustrative, non-limiting embodiment, an Information Handling System (IHS) may include a processor and a memory coupled to the processor, the memory having program instructions stored thereon that, upon execution, cause the IHS to: select a VM having a plurality of VM files; identify, among the plurality of VM files, a movable VM file; and transfer the movable VM file from a first storage tier to a second storage tier based upon a usage classification associated with the movable VM file.

In some cases, the movable VM file may include at least one of: a snapshot state file, a suspended state file, or a VM snapshot. Moreover, the usage classification may be selected from the group consisting of: high usage, medium usage, and low usage.

The high usage classification may be associated with at least one of: (a) the snapshot state file, where the snapshot state file represents a state of a current (N) or an immediately preceding (N−1) snapshot, created or used before expiration of a first selected time period; (b) the suspended state file, where the suspended state file has been unused for the first selected time period; or (c) the VM snapshot, where the VM snapshot is a current (N) or an immediately preceding (N−1) snapshot, created or used before expiration of the first selected time period. For example, the first selected time period may approximately one week.

Additionally, or alternatively, the medium usage classification may be associated with at least one of: (a) the snapshot state file, where the snapshot state file represents a state of a current (N) or an immediately preceding (N−1) snapshot, created or used before expiration of a second selected time period; (b) the suspended state file, where the suspended state file has been unused for the first selected time period; or (c) the VM snapshot, where the VM snapshot is a current (N) or an immediately preceding (N−1) snapshot, created or used before expiration of the second selected time period. For example, the second selected time period may be approximately ten weeks.

Additionally, or alternatively, the low usage classification may be associated with at least one of: (a) the snapshot state file, where the snapshot state file represents a state of one of a twice preceding (N−2) through fifth preceding (N−5) snapshot, created or used before expiration of a third selected time period; (b) the suspended state file, where the suspended state file has been unused for a fourth selected time period; or (c) the VM snapshot, where the VM snapshot is one of a twice preceding (N−2) through fifth preceding (N−5) snapshot, created or used before expiration of the third selected time period. For example, the third selected time period may be approximately five months, and the fourth selected time period may be approximately one month.

The program instructions, upon execution, may also cause the IHS to identify an unmovable VM file and abstain from transferring the unmovable VM file from the first storage tier to the second storage tier. The unmovable VM file may include at least one of: an NVRAM file, a VM paging file, a VM data disk, a VM swap file, or a current VM log file.

In some implementations, the program instructions, upon execution, may cause the IHS to detect a change in the usage classification, and at least one of: (a) the change comprises a change from a higher usage classification to a lower usage classification, the first storage tier comprises one or more SSDs and excludes any HDDs, and the second storage tier comprises one or more SSDs and excludes any SSDs; or (b) the change comprises a change from a lower usage classification to a higher usage classification, the first storage tier comprises one or more HDDs and excludes any SSDs, and the second storage tier comprises one or more SSDs and excludes any HDDs.

The VM may be executed on behalf of a client IHS, and the program instructions, upon execution, may cause the IHS to modify the usage classification based upon context information obtained from the client IHS. The VM may be executed on behalf of a client IHS, and the program instructions, upon execution, may cause the IHS to: (a) determine that the VM file is designed to be moved during runtime, where the context information comprises a user's presence before the client IHS, and where the modification of the usage classification comprises an upgrade in the usage classification; or (b) determine that the VM file is designed to be moved during runtime, where the context information comprises a user's absence from the client IHS, and where the modification of the usage classification comprises a downgrade in the usage classification.

Additionally, or alternatively, the VM may be executed on behalf of a client IHS, and the program instructions, upon execution, may cause the IHS to: (a) determine that the VM file is designed to be moved offline, where the context information comprises a user's absence before the client IHS, and where the modification of the usage classification comprises an upgrade in the usage classification; or (b) determine that the VM file is designed to be moved offline, where the context information comprises a user's presence before the client IHS, and where the modification of the usage classification comprises a downgrade in the usage classification.

The program instructions, upon execution, further cause the IHS to transfer each of the plurality of VM files from the first storage tier to the second storage tier in order from highest to lowest usage classification. Moreover, the program instructions, upon execution, may cause the IHS to create a link for a given VM file with low usage classification prior to transferring the given VM file to the second storage tier. The program instructions, upon execution, may further cause the IHS to replace the link with the given VM file after all higher priority VM files have been transferred.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 5 is a table illustrating examples of unmovable VM files, according to some embodiments.

FIG. 6 is a table illustrating examples of movable VM files, according to some embodiments.

DETAILED DESCRIPTION

Figure 1:
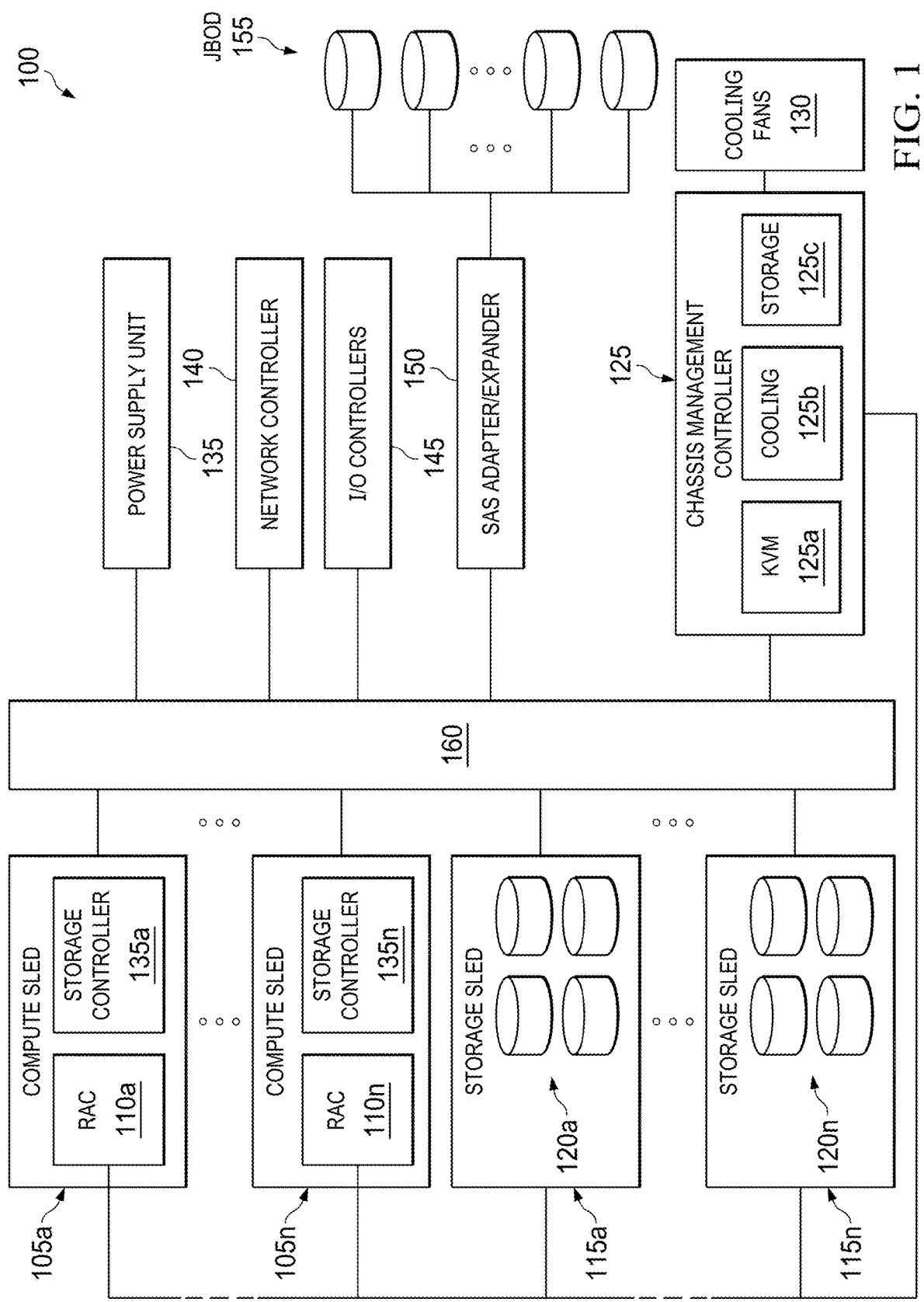
FIG. 1 is a block diagram of examples of components of a chassis configured to dynamically move virtual machine (VM) data based upon context, according to some embodiments.

Embodiments of systems and methods for dynamically moving virtual machine (VM) data based upon context are described. Data is one of the most important assets of any business. With tremendous data growth driven by business applications, digital media, analytics, database systems, etc., enterprises have been suffering from an information glut of unprecedented proportions. Accessing stored data in 5-10 ms is often not fast enough for data-driven businesses that must respond in real-time to global opportunities around the clock.

In context of VMs, a "snapshot" is an entity that preserves the state and data of a VM at a specific point in time, and it may include the VM's power state (e.g., powered-on, powered-off, suspended), as well as all of the files that make up the VM (e.g., disks, memory, and other devices, such as virtual network interface cards). In certain VMs, the virtual disk may be a file (e.g., with a ".vmdk" extension) residing on a data store (LUN). When a snapshot is created, the original disk becomes read-only and all new data changes are written into a temporary delta disk pointing to the original one. The delta disk contains the differences between the state at the moment when the snapshot was taken and the current state of the virtual disk. The process of taking a VM snapshot may also involve the creation of snapshots and metadata information (e.g., with a ".vmsd" extension) and running state information (e.g., with a ".vmsn" extension), among others.

At the present time, managing VM data dynamically and efficiently on different type of drives (e.g., HDDs, SSD's, NVMes, and NVDIMMs) can be challenging. In a modular server environment, it is possible to use different types of storage. Each different type of storage drive has different costs and properties (e.g., size, reading and writing speed, IOPS, caching, etc.).

Consider VMs provisioned using multiple datastores of different types of storage drives. Over a period of time, these VMs may get bloated out due to several VM snapshots (some are up to 100s of GB of data in size) causing VM motions to get slower. Also, with large sizes, VMs may occupy a large disk space possibly globing up faster SSD and NVMe drives, even for their dormant parts (such as snapshots), which sometimes are not utilized. In that regard, systems and methods described herein provide a way to effectively store VMs by keeping their more active parts in the faster storage tier, and dormant parts in the slower storage tiers.

For example, in a datacenter, it is possible that at a given point in time, thousands of snapshots are taken. These snapshots reside for an interval that is specified before the next point in time copy is taken; which also depends on an administrator keeping so many numbers of snapshot copies for certain period of time. Also, other types of snapshot files can be very large, such as memory snapshots, which can be equal to the size of the system memory, and are not used frequently.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 1 is a block diagram illustrating certain components of chassis 100 comprising one or more compute sleds 105a-n and one or more storage sleds 115a-n that may be configured to implement systems and methods for dynamically moving VM data based upon context. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays.

Other embodiments may include additional types of sleds that provide various types of storage and/or processing capabilities. Other types of sleds may provide power management and networking functions. Sleds may be individually installed and removed from the chassis 100, thus allowing the computing and storage capabilities of chassis 100 to be reconfigured by swapping the sleds with different types of sleds, in many cases without affecting the operations of the other installed sleds.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. Chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

Sleds 105a-n, 115a-n may be individually coupled to chassis 100 via connectors that correspond to the bays provided by the chassis 100 and that physically and electrically couple an individual sled to backplane 160. Chassis backplane 160 may be a printed circuit board that includes electrical traces and connectors that are configured to route signals between the various components of chassis 100 that are connected to backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
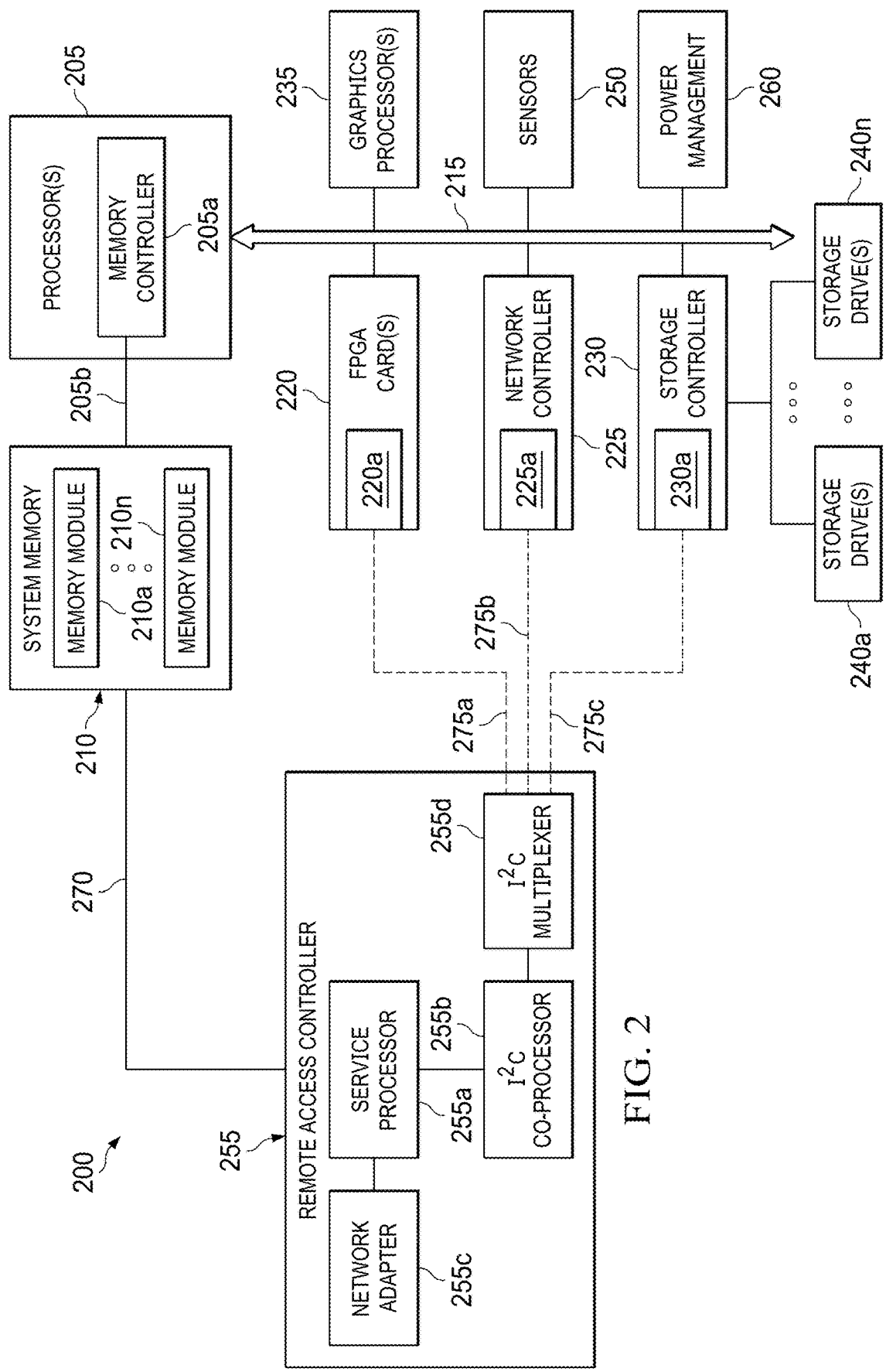
FIG. 2 is a block diagram of examples of components of an Information Handling System (IHS) configured to dynamically move VM data based upon context, according to some embodiments.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

Each compute sled 105a-n includes a remote access controller (RAC) 110a-n. Remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, chassis 100 of FIG. 1 further includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

In the illustrated embodiment, the chassis management controller 125 includes a storage module 125c that provides capabilities for managing and configuring certain aspects of the storage devices of chassis 100, such as the storage devices provided within storage sleds 115a-n and within the JBOD 155. Each of the storage controllers 135a-n may be used to implement various types of virtual storage configurations, such as RAID configurations, using the storage devices provided by the chassis 100. Accordingly, chassis 100 may support large numbers of combinations of different storage devices that may be configured in various types virtual storage profiles, thus resulting in significant difficulty for administrators to track the storage devices that are currently available for setting up a new storage configuration, or for replacing a failed storage device within an existing storage configuration.

Storage module 125c of the chassis management controller 125 may support requests for storage configurations by each of the storage controllers 135a-n by selecting and mapping storage devices from those available within the chassis 100, and in certain embodiments, from those available in any other similarly configured chassis that can be accessed by the chassis management controller 125.

Storage module 125c may also be further configured to manage all of the unmapped storage devices of chassis 100 as a global pool of spare storage devices that may be used to support the storage configurations operated by each of the storage controllers 135a-n. In this manner, the capabilities of the chassis management controller 125 may provide administrators with the ability to set up virtual storage configurations using all shared storage resources that are available within a chassis 100, or within other accessible chassis.

FIG. 2 shows an example of an IHS 200 configured to implement systems and methods for dynamically moving VM data based upon context. For example, IHS 200 may be implemented as any desktop, laptop, or tablet computing device in the form of a client device or IHS. In some cases, IHS 200 may also be a compute sled or server, such as compute sleds 105a-n of FIG. 1, that may be installed within chassis 100 and which may in turn be installed within a rack. Installed in this manner, IHS 200 may utilize shared power, network and cooling resources provided by the chassis and/or rack.

IHS 200 may utilize one or more processor(s) 205. In some embodiments, processor(s) 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 include an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

System memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, system memory 210 may include multiple removable memory modules. The system memory 210 of the illustrated implementation includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other implementations of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more sensors 250.

In various implementations, sensors 250 may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed). One or more of sensors 250 may be disposed within IHS 200, on a bezel of IHS 200, on a display, on a hinge coupling a display portion to a keyboard portion of IHS 200, or on a keyboard or other input device.

Processor(s) 205 may be configured to process information received from sensors 250, and to perform methods for changing a VM/VM file's usage classification using contextual information obtained from sensors 250.

For instance, during operation of IHS 200, the user may open, close, flip, swivel, or rotate a display to produce different IHS postures. In some cases, processor(s) 205 may be configured to determine a current posture of IHS 200 using sensors 250. For example, in a dual-display IHS implementation, when a first display (in a first IHS portion) is folded against a second display (in a second IHS portion) so that the two displays have their backs against each other, IHS 200 may be said to have assumed a book posture. Other postures may include a table posture, a display posture, a laptop posture, a stand posture, or a tent posture, depending upon whether IHS 200 is stationary, moving, horizontal, resting at a different angle, and/or its orientation (landscape vs. portrait).

For example, in a laptop posture, a first display surface of a first display may be facing the user at an obtuse angle with respect to a second display surface of a second display or a physical keyboard portion. In a tablet posture, a first display may be at a straight angle with respect to a second display or a physical keyboard portion. And, in a book posture, a first display may have its back resting against the back of a second display or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor(s) 205 may process user presence data received by sensors 250 and may determine, for example, whether an IHS's end-user is present or absent. Moreover, in situations where the end-user is present before IHS 200, processor(s) 205 may further determine a distance of the end-user from IHS 200 continuously or at predetermined time intervals. The detected or calculated distances may be used by processor(s) 205 to classify the user as being in the IHS's near-field (user's position<threshold distance A), mid-field (threshold distance A<user's position<threshold distance B, where B>A), or far-field (user's position>threshold distance C, where C>B) with respect to IHS 200.

More generally, in various implementations, processor(s) 205 may receive and/or to produce system context information using sensors 250 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 200, a physical keyboard external to IHS 200, or an on-screen keyboard), whether the user operating the keyboard is typing with one or two hands (e.g., holding a stylus, or the like), a time of day, software application(s) under execution in focus for receiving keyboard input, whether IHS 200 is inside or outside of a carrying bag, ambient lighting, a battery charge level, whether IHS 200 is operating from battery power or is plugged into an AC power source (e.g., whether the IHS is operating in AC-only mode, DC-only mode, or AC+DC mode), a power consumption of various components of IHS 200.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed.

In certain embodiments, graphics processor 235 may be included within one or more video or graphics cards, or an embedded controller, installed as components of the IHS 200. Graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

IHS 200 may also support one or more storage controllers 230 that may be utilized to provide access to virtual storage configurations. For instance, storage controller 230 may provide support for RAID (Redundant Array of Independent Disks) configurations of storage devices 240*a-n*, such as storage drives provided by storage sleds 115*a-n* and JBOD 155 of FIG. 1. In some embodiments, storage controller 230 may be a Host Bus Adapter (HBA).

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. Certain functions provided by a BIOS may be implemented, in full or in part, by the remote access controller 255.

As described, IHS 200 may be a storage sled 115*a-n*, such as shown with regard to FIG. 1. Accordingly, IHS 200 may be included within a large system of similarly configured IHSs that may be housed within the same chassis, rack and/or datacenter. In such scenarios, the remote access controller 255 may be configured to support automated deployment of the operating system of IHS 200 according to configuration settings specified by an administrator.

Remote access controller 255 may operate from a different power plane from the processor(s) 205 and other components of IHS 200, thus allowing the remote access controller 255 to operate, and management tasks to proceed, while the processing cores of IHS 200 are powered off. In some embodiments, remote access controller 255 may perform various functions to verify the integrity of the IHS 200 and its hardware components prior to initialization of the IHS 200 (i.e., in a bare-metal state).

Remote access controller 255 may include service processor 255a, or a specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various devices 220, 225, 230 of an IHS via a sideband interface. In such embodiments, the messages in support of the monitoring and management function may be implemented using MCTP (Management Component Transport Protocol) that may be transmitted using I2C sideband bus connection 275a-c established with each of the respective managed devices 220, 225, 230. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the I2C sideband bus connection 275a-c.

In certain embodiments, the service processor 255a of remote access controller 255 may rely on an I2C co-processor 255b to implement sideband I2C communications between the remote access controller 255 and managed components 220, 225, 230 of the IHS. The I2C co-processor 255b may be a specialized co-processor or micro-controller that is configured to interface via a sideband I2C bus interface with the managed hardware components 220, 225, 230 of IHS. In some embodiments, the I2C co-processor 255b may be an integrated component of the service processor 255a, such as a peripheral system-on-chip feature that may be provided by the service processor 255a. Each I2C bus 275a-c is illustrated as single line; however, each I2C bus 275a-c may include a clock line and data line that couple the remote access controller 255 to I2C endpoints 220a, 225a, 230a, which may be referred to as field replaceable units (FRUs).

I2C co-processor 255b may interface with the individual managed devices 220, 225 and 230 via individual sideband I2C buses 275a-c selected through the operation of an I2C multiplexer 255d. Via switching operations by the I2C multiplexer 255d, a sideband bus connection 275a-c may be established by a direct coupling between the I2C co-processor 255b and an individual managed device 220, 225 or 230.

In providing sideband management capabilities, the I2C co-processor 255b may each interoperate with corresponding endpoint I2C controllers 220a, 225a, 230a that implement the I2C communications of the respective managed devices 220, 225, 230. The endpoint I2C controllers 220a, 225a, 230a may be implemented as a dedicated microcontroller for communicating sideband I2C messages with the remote access controller 255, or endpoint I2C controllers 220a, 225a, 230a may be integrated SoC functions of a processor of the respective managed device endpoints 220, 225, 230.

In various embodiments, IHSs 100 and 200 may not include each of the components shown in FIGS. 1 and 2. Additionally, or alternatively, IHSs 100 and 200 may include various additional components in addition to those that are shown in FIGS. 1 and 2. Furthermore, some components that are represented as separate components in FIGS. 1 and 2 may in certain embodiments instead be integrated with other components. For example, in certain embodiments, all or a portion of the functionality provided by the illustrated components may instead be provided by components integrated into one or more processor(s) as a system-on-chip (SoC) or the like.

Figure 3:
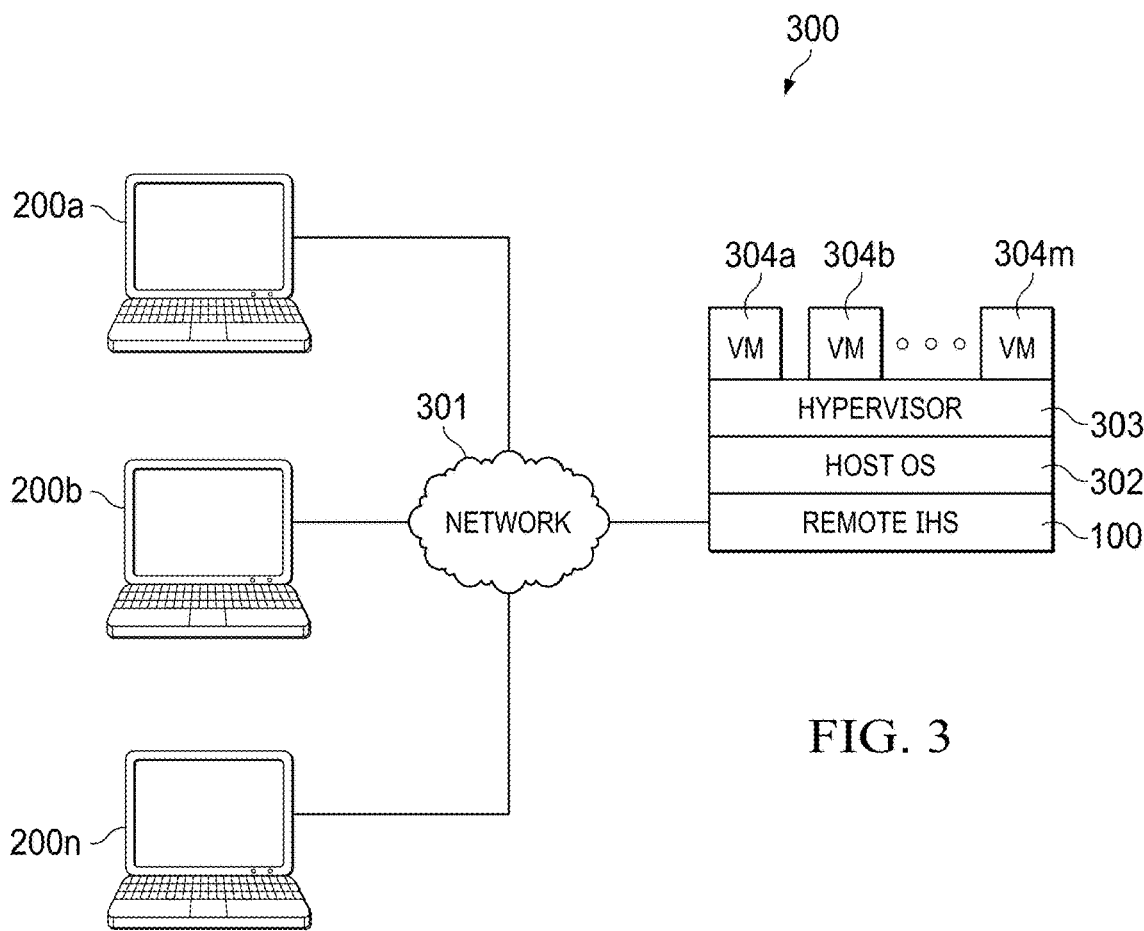
FIG. 3 is a block diagram of an example of a hardware architecture configured to dynamically move VM data based upon context, according to some embodiments.

FIG. 3 is a block diagram of an example of hardware architecture 300 configured to dynamically move VM data based upon context. In some embodiments, a plurality of client devices 200A-N may be implemented as different instances of IHS 200 in FIG. 2, and remote server or IHS 100 may be implemented as shown in FIG. 1.

As shown, client devices 200A-N are coupled to remote IHS 100 via network 301. Network 301 may be, for example, a Wi-Fi network, a cellular network (e.g., second generation (2G), third generation (3G), fourth generation (4G), a Long Term Evolution (LTE), or a fifth generation (5G) network), a satellite network, an intranet, a Virtual Private Network (VPN), and/or the Internet.

In type-2 or hosted hypervisor implementations, server IHS 100 executes operating system (OS) 302 (e.g., Windows Server, Mac OS X Server, variants of Linux, etc.), which in turn enables execution of hypervisor 303 (e.g., Parallels, VMware workstation, etc.) configured to create and run VMs 304A-M at the request of clients 200A-N. In type-1 or bare-metal implementations, however, OS 301 may be absent and hypervisor 303 (e.g., HyperV, VMware ESXi, etc.) may run directly on hardware 100. In some cases, two or more of VMs 304A-N may be executed on behalf of the same client IHS 200A.

Figure 4:
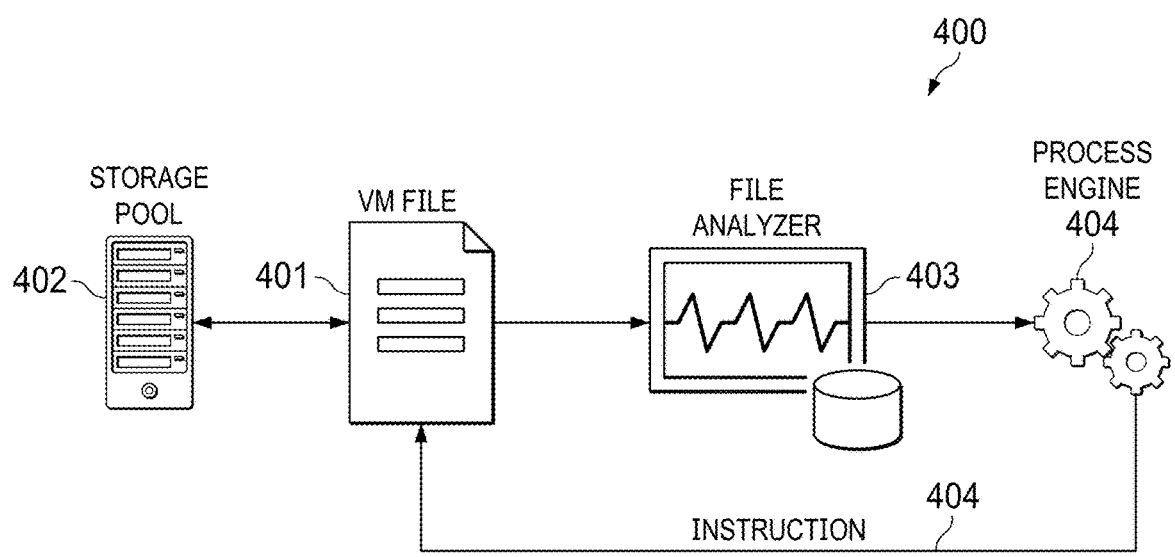
FIG. 4 is a block diagram of an example of a software architecture configured to dynamically move VM data based upon context, according to some embodiments.

FIG. 4 is a block diagram of an example of software architecture 400 configured to dynamically move VM data based upon context. In various embodiments, software architecture 400 may be provided through the execution of program instructions stored in system memory 210 of FIG. 2.

VMs 304A-M are physically stored as multiple individual files in a filesystem. As shown in architecture 400, VM file 401 is stored in storage pool 402 (e.g., any of storage sleds 115a-n or storage drives 240a-n). Meanwhile, OS 302 and/or hypervisor 303 may include two components, file analyzer 403 and process engine 404.

File analyzer 403 may classify VM file 401 as an unmovable file (files that cannot be moved into tiered storage) or a moveable file (files that can be moved into tiered storage), maintain a data table, and pass it down to process engine 404. To illustrate this process, table 500 of FIG. 5 shows examples of unmovable VM files (NVRAM files, VM paging files, VM data disks, VM swap files, or current VM log files). In some cases, once an unmovable VM file is identified, process engine 404 may abstain from transferring the unmovable VM file. Table 600 of FIG. 6 shows examples of movable VM files (snapshot state files, suspended state files, or VM snapshots).

If VM file 401 is a moveable file, process engine 404 may move the file to tiered storage based on context (e.g., access point, user presence, etc.), usage classification, and/or timestamp using instruction 404. For example, table 600 of FIG. 6 includes three usage classifications: High, Medium, and Low; each having static and/or dynamic rules for classifying different types of movable files (e.g., by file extension).

For example, in some embodiments, the high usage classification may be associated with: (a) snapshot state files, where the snapshot state file represents a state of a current (N) or an immediately preceding (N−1) snapshot, created or used before expiration of a first selected time period (e.g., approximately one week, or 5-9 days); (b) suspended state files, where the suspended state file has been unused for the first selected time period; and/or (c) VM snapshots, where the VM snapshot is a current (N) or an immediately preceding (N−1) snapshot, created or used before expiration of the first selected time period.

The medium usage classification may be associated with: (a) snapshot state files created or used before expiration of a second selected time period (e.g., approximately ten weeks, or 8-12 weeks); (b) suspended state files that have been unused for the first selected time period; and/or (c) VM snapshots created or used before expiration of the second selected time period. Meanwhile, the low usage classification may be associated with: (a) snapshot state files representing a state of one of a twice preceding (N−2) through fifth preceding (N−5) snapshot, created or used before expiration of a third selected time period (e.g., approximately 5 months, or 4-6 months); (b) suspended state files that have been unused for a fourth selected time period (e.g., approximately one month, or 20-45 days); and/or (c) VM snapshots, including a twice preceding (N−2) through fifth preceding (N−5) snapshot, created or used before expiration of the third selected time period.

In some cases, process engine 404 may detect a change in the usage classification, and (a) the change is from a higher usage classification to a lower usage classification, and those files are transferred from a first storage tier (one or more SSDs and no any HDDs) to a second storage tier (one or more SSDs and no SSDs); or (b) the change is from a lower usage classification to a higher usage classification, and those files are transferred from the second storage tier to the first storage tier.

File analyzer 403 may also modify the usage classification based upon context information obtained from the client IHS. In some cases, the context information my include a VM designation that determines whether the associated VM/VM files are to be moved during runtime or offline. Additionally, or alternatively, context information may include any context information received from sensors 250.

For example, if the VM file is designated to be moved during runtime and the end user is present before the client IHS, and the modification may include upgrade in the usage classification (from lower to higher usage classification). But if the end user is absent from the client IHS, the modification may be a downgrade in the usage classification (from higher to lower usage classification). Conversely, if the VM file is de designated to be moved offline, when the user is absent from the client IHS the modification may include an upgrade in the usage classification; and if the user is present before the client IHS, the modification may include a downgrade in the usage classification.

In various implementations, CMC 125 and/or RAC 255 may classify attached storage devices into multiple tiers based on cost and/or performance. For example, Hard Disk Drives (HDDs) may be collated to Tier Low, whereas all Solid-State Drives (SSDs) may be bundled into Tier High and Medium. Non-volatile memory (NVMes) may be classified as Tier 0 (e.g., for unmovable files). This information may be made available to OS 302 and/or hypervisor 303.

Generally speaking, VM motion is a process by which VMs are moved. Availability is the concept where post motion the VM is activated and can start servicing customers. Until the entire VM is moved, activation does not happen. When the VM contains large snapshots (dormant parts which don't play a part in activation of VM), the activation is delayed until the entire VM is moved; yet it is often advantageous for VMs to be activated as fast as possible.

In some embodiments, after categorizing VM files as movable or unmovable, file analyzer 403 and/or process engine 404 may use a methodology for moving VM/VM files in batches intelligently. First, file analyzer 403 and/or process engine 404 may classify all VM/VM files based on the recent activity into categories such as: Recent (used at least once in last 2 weeks), Least Recently Used (used between 2 weeks to 6 months), Dormant (not used in 6 months-1 year), Retired (either deleted, never started, dormant beyond 1 year, etc.).

Then, the VM/VM files may be moved based on the recency of activity (e.g., Recent first, Recently Used next, Dormant next. Retired may not be moved). Within VMs of similar recency, the VM files are moved based on the tiers, unmoveable and High first. As soon as this is done, the VMs are activated. In some cases, in place of Medium and Low portions of the VMs, a soft link may be provided. The link may point to non-existing entities until full migration is complete.

After activating all VMs of similar recency, the Medium VM files are moved next for all those VMs. At this time, the softlinks for the Medium files are replaced with actual files. The Low portions of the VMs are moved after all the above activities are complete.

As such, a VM and parts of movable VM contents may be moved intelligently and in batches, so that none of the VM operations are affected in a datacenter. In various embodiments, systems and methods described herein may: splice a VM horizontally based on physical storage files; classify parts of VM based on the coldness of associated VM files (e.g., VM snapshots etc.); and/or use classification of storage tiers to move various parts of VM to different tiers.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
select a virtual machine (VM) having a plurality of VM files;
identify, among the plurality of VM files, a movable VM file comprising at least one of: a snapshot state file, a suspended state file, or a VM snapshot; and
transfer the movable VM file from a first storage tier to a second storage tier based upon a usage classification associated with the movable VM file, wherein the usage classification is selected from the group consisting of: high usage, medium usage, and low usage, and wherein:
the high usage classification is associated with at least one of: (a) the snapshot state file, wherein the snapshot state file represents a state of a current (N) or an immediately preceding (N−1) snapshot, created or used before expiration of a first selected time period; (b) the suspended state file, wherein the suspended state file has been unused for the first selected time period; or (c) the VM snapshot, wherein the VM snapshot is a current (N) or an immediately preceding (N−1) snapshot, created or used before expiration of the first selected time period;
the medium usage classification is associated with at least one of:
(a) the snapshot state file, wherein the snapshot state file represents a state of a current (N) or an immediately preceding (N−1) snapshot, created or used before expiration of a second selected time period; (b) the suspended state file, wherein the suspended state file has been unused for the first selected time period; or (c) the VM snapshot, wherein the VM snapshot is a current (N) or an immediately preceding (N−1) snapshot, created or used before expiration of the second selected time period; and the low usage classification is associated with at least one of: (a) the snapshot state file, wherein the snapshot state file represents a state of one of a twice preceding (N−2) through fifth preceding (N−5) snapshot, created or used before expiration of a third selected time period; (b) the suspended state file, wherein the suspended state file has been unused for a fourth selected time period; or (c) the VM snapshot, wherein the VM snapshot is one of a twice preceding (N−2) through fifth preceding (N−5) snapshot, created or used before expiration of the third selected time period.

2. The IHS of claim 1, wherein the first selected time period is at least one of: approximately one week, or 5 to 9 days.

3. The IHS of claim 1, wherein the second selected time period is at least one of: approximately ten weeks, or 8 to 12 weeks.

4. The IHS of claim 1, wherein the third selected time period is at least one of: approximately five months, or 4 to 6 months; and wherein the fourth selected time period is at least one of: approximately one month, or 20 to 45 days.

5. The IHS of claim 1, wherein the program instructions, upon execution, further cause the IHS to:
identify an unmovable VM file; and
abstain from transferring the unmovable VM file from the first storage tier to the second storage tier.

6. The IHS of claim 5, wherein the unmovable VM file comprises at least one of: an NVRAM file, a VM paging file, a VM data disk, a VM swap file, or a current VM log file.

7. The IHS of claim 1, wherein the program instructions, upon execution, further cause the IHS to detect a change in the usage classification, and wherein at least one of: (a) the change comprises a change from a higher usage classification to a lower usage classification, the first storage tier comprises one or more SSDs and excludes any HDDs, and the second storage tier comprises one or more SSDs and excludes any SSDs; or (b) the change comprises a change from a lower usage classification to a higher usage classification, the first storage tier comprises one or more HDDs and excludes any SSDs, and the second storage tier comprises one or more SSDs and excludes any HDDs.

8. The IHS of claim 1, wherein the VM is executed on behalf of a client IHS, and wherein the program instructions, upon execution, further cause the IHS to modify the usage classification based upon context information obtained from the client IHS.

9. The IHS of claim 1, wherein the VM is executed on behalf of a client IHS, and wherein the program instructions, upon execution, further cause the IHS to: (a) determine that the VM file is designed to be moved during runtime, wherein the context information comprises a user's presence before the client IHS, and wherein the modification of the usage classification comprises an upgrade in the usage classification; or (b) determine that the VM file is designed to be moved during runtime, wherein the context information comprises a user's absence from the client IHS, and wherein the modification of the usage classification comprises a downgrade in the usage classification.

10. The IHS of claim 1, wherein the VM is executed on behalf of a client IHS, and wherein the program instructions, upon execution, further cause the IHS to: (a) determine that the VM file is designed to be moved offline, wherein the context information comprises a user's absence before the client IHS, and wherein the modification of the usage classification comprises an upgrade in the usage classification; or (b) determine that the VM file is designed to be moved offline, wherein the context information comprises a user's presence before the client IHS, and wherein the modification of the usage classification comprises a downgrade in the usage classification.

11. The IHS of claim 1, wherein the program instructions, upon execution, further cause the IHS to transfer each of the plurality of VM files from the first storage tier to the second storage tier in order from highest to lowest usage classification.

12. The IHS of claim 11, wherein the program instructions, upon execution, further cause the IHS to create a link for a given VM file with low usage classification prior to transferring the given VM file to the second storage tier.

13. The IHS of claim 12, wherein the program instructions, upon execution, further cause the IHS to replace the link with the given VM file after all higher priority VM files have been transferred.

14. A memory storage device having program instructions stored thereon that, upon execution by one or more processors of an Information Handling System (IHS), cause the IHS to:
select a virtual machine (VM) having a plurality of VM files;
identify, among the plurality of VM files, a movable VM file comprising at least one of: a snapshot state file, a suspended state file, or a VM snapshot; and
transfer the movable VM file from a first storage tier to a second storage tier based upon a usage classification associated with the movable VM file, wherein the usage classification is selected from the group consisting of: high usage, medium usage, and low usage, and wherein:
the high usage classification is associated with at least one of: (a) the snapshot state file, wherein the snapshot state file represents a state of a current (N) or an immediately preceding (N−1) snapshot, created or used before expiration of a first selected time period; (b) the suspended state file, wherein the suspended state file has been unused for the first selected time period; or (c) the VM snapshot, wherein the VM snapshot is a current (N) or an immediately preceding (N−1) snapshot, created or used before expiration of the first selected time period;
the medium usage classification is associated with at least one of: (a) the snapshot state file, wherein the snapshot state file represents a state of a current (N) or an immediately preceding (N−1) snapshot, created or used before expiration of a second selected time period; (b) the suspended state file, wherein the suspended state file has been unused for the first selected time period; or (c) the VM snapshot, wherein the VM snapshot is a current (N) or an immediately preceding (N−1) snapshot, created or used before expiration of the second selected time period; and
the low usage classification is associated with at least one of: (a) the snapshot state file, wherein the snapshot state file represents a state of one of a twice preceding (N−2) through fifth preceding (N−5) snapshot, created or used before expiration of a third selected time period; (b) the suspended state file, wherein the suspended state file has been unused for a fourth selected time period; or (c) the VM snapshot, wherein the VM snapshot is one of a twice preceding (N−2) through fifth preceding (N−5) snapshot, created or used before expiration of the third selected time period.

15. A method, comprising:
selecting a virtual machine (VM) having a plurality of VM files;
identifying, among the plurality of VM files, a movable VM file comprising at least one of: a snapshot state file, a suspended state file, or a VM snapshot; and
transferring the movable VM file from a first storage tier to a second storage tier based upon a usage classification associated with the movable VM file, wherein the usage classification is selected from the group consisting of: high usage, medium usage, and low usage, and wherein:
the high usage classification is associated with at least one of: (a) the snapshot state file, wherein the snapshot state file represents a state of a current (N) or an immediately preceding (N−1) snapshot, created or used before expiration of a first selected time period; (b) the suspended state file, wherein the suspended state file has been unused for the first selected time period; or (c) the VM snapshot, wherein the VM snapshot is a current (N) or an immediately preceding (N−1) snapshot, created or used before expiration of the first selected time period;
the medium usage classification is associated with at least one of: (a) the snapshot state file, wherein the snapshot state file represents a state of a current (N) or an immediately preceding (N−1) snapshot, created or used before expiration of a second selected time period; (b) the suspended state file, wherein the suspended state file has been unused for the first selected time period; or (c) the VM snapshot, wherein the VM snapshot is a current (N) or an immediately preceding (N−1) snapshot, created or used before expiration of the second selected time period; and
the low usage classification is associated with at least one of: (a) the snapshot state file, wherein the snapshot state file represents a state of one of a twice preceding (N−2) through fifth preceding (N−5) snapshot, created or used before expiration of a third selected time period; (b) the suspended state file, wherein the suspended state file has been unused for a fourth selected time period; or (c) the VM snapshot, wherein the VM snapshot is one of a twice preceding (N−2) through fifth preceding (N−5) snapshot, created or used before expiration of the third selected time period.

* * * * *